Patented Apr. 14, 1931

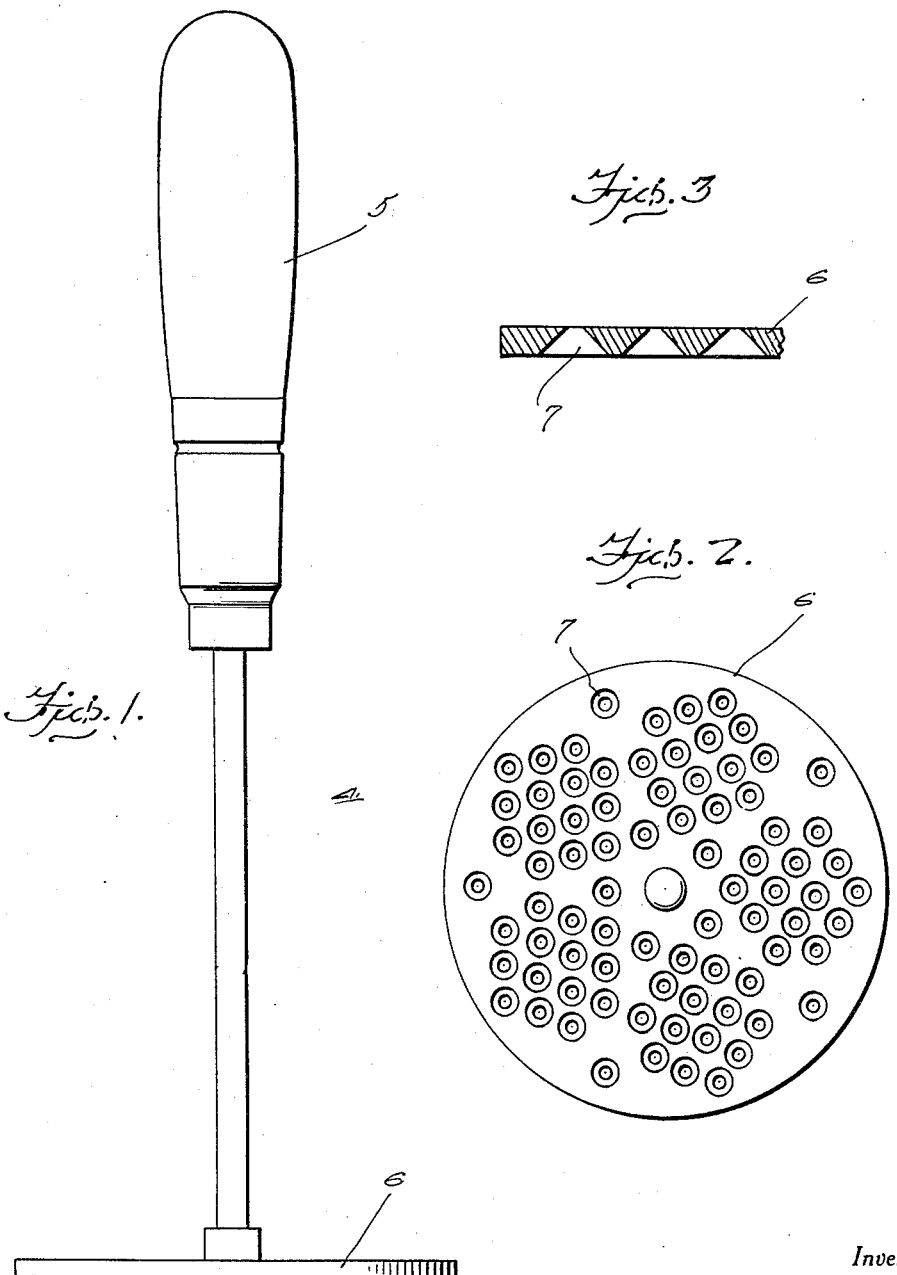

1,800,653

UNITED STATES PATENT OFFICE

WILLIAM STEWART MORRIS, OF HARRISBURG, PENNSYLVANIA

CULINARY IMPLEMENT

Application filed October 30, 1929. Serial No. 403,522.

This invention relates to an improved culinary implement especially adapted for kitchen use and specifically constructed as a masher and ricer for fruits and vegetables.

The improved device is expressly constructed for mashing and ricing potatoes and comprises a shank having a handle at one end and a head at the opposite end, wherein the head is of general disc-like form and provided with a multiplicity of unique apertures for effectively accomplishing the desired result.

In the drawings:

Figure 1 is an elevational view of a device constructed in accordance with the present invention.

Figure 2 is a bottom plan view of the same.

Figure 3 is a fragmentary sectional view through the head.

Referring to the drawings by reference numerals it will be seen that the shank is indicated by the reference character 4 and is of suitable construction. At one end is an appropriate hand grip 5 and at the opposite end is the head 6. This head comprises a metal disc expressly distinguished by the provision of a multiplicity of holes or apertures 7.

These holes are preferably of conical configuration, thereby providing a relatively large entrance at the bottom and a correspondingly small exit at the top. This tapered configuration of the holes constituting passages are for the material acted on, and forms the principal feature of the invention.

The implement herein shown and described constitutes a distinguishable contribution to the art especially characterized by the disc-like head having the tapered or conical holes formed therein. Thus, the holes are large at the bottom and taper toward the top, and this arrangement gives the potatoes or vegetables an unimpeded passage through the holes for both ricing and mashing.

The result is that the design of the holes not only mashes the potatoes but also beats the potatoes, saving the labor of beating after they are mashed as is necessary in the ordinary type of masher. The smooth surfaces of the walls of the holes offer no obstructions for the material to hang on or to stick to.

The device is used by pressing the apertured head down through the potatoes and lifting it again through the potatoes. This is for mashing. If it is desired to rice the potatoes, it is only necessary to press the head through the potatoes and to shake or scrape the ribbonlike portions into a separate utensil.

This masher will mash without lumps, obviate the necessity of subsequent beating and avoids the use of a separate ricer as is generally necessary. The implement may be employed solely for ricing without mashing. It can be cleaned by shaking it in water or holding it under the running water from a spigot.

It is easy to handle, light in weight, simple and inexpensive, and capable of filling the requirements of a device of this class in a highly satisfactory manner.

A careful consideration of the drawings in connection with the description will enable the reader to obtain a clear understanding of the invention. Therefore, a more lengthy description is regarded as unnecessary.

Minor changes in shape, size and rearrangement of features coming within the field of invention claimed may be resorted to in actual practice if desired.

I claim:

As a new article of manufacture, a culinary implement for kitchen use comprising a shank, a hand grip at one end of the shank, a flat operating plate at the opposite end of the shank, said plate being of uniform thickness and provided with a plurality of like circular apertures, each of said apertures having the walls thereof gradually tapered from the bottom of the plate to the upper end of the plate, the restricted outlets of said apertures being all located at the top surface of the plate, and the wide entrance openings of the apertures being all arranged at the bottom face of the plate, whereby to permit said plate to be employed for mashing, beating and ricing purposes.

In testimony whereof I affix my signature.

WILLIAM STEWART MORRIS.